(No Model.)
J. T. SIPE.
Nut Lock.
No. 229,764. Patented July 6, 1880.
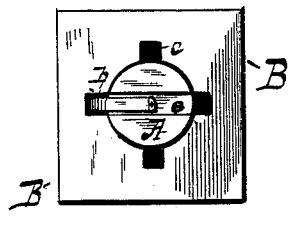
Witnesses:
Inventor
John T. Sipe
Per C. A. Watson & Co.
Attorneys.

UNITED STATES PATENT OFFICE.

JOHN T. SIPE, OF HARRISONBURG, VIRGINIA.

NUT-LOCK.

SPECIFICATION forming part of Letters Patent No. 229,764, dated July 6, 1880.

Application filed April 7, 1880. (No model.)

*To all whom it may concern:*

Be it known that I, JOHN T. SIPE, of Harrisonburg, in the county of Rockingham and State of Virginia, have invented certain new and useful Improvements in Nut-Locks; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention relates to certain new and useful improvements in nut-locks; and it consists in the construction and arrangement of parts, as will be hereinafter more fully set forth.

In the annexed drawings, which fully illustrate my invention, Figure 1 is a front elevation. Fig. 2 is a bottom-plan view, and Fig. 3 is a section showing the spring being pressed back.

In the drawings, A represents the bolt; B, the nut; *a*, groove in side and across the end of the bolt; *b*, spring working in groove *a*; *c*, depressions or notches on the inside of nut to engage spring *b*.

The bolt A is constructed with the usual head, and is provided with a groove, *a*, extending from near the head of the bolt along its side, and is continued across its end. The spring *b* works in said groove, and is secured therein at *d*, its free end passing across the end of the bolt and bent, as shown at *e*.
The groove is extended across the end of the bolt and the end of the spring bent to work in it, for the purpose of guiding the spring in the groove in the side of the bolt, and for strengthening and preventing any turning or twisting of said spring.

The nut B is of the ordinary construction, with the exception of the notches *c*, cut in from the screw-threaded opening.

The operation is as follows: By pressing the spring down in the groove the nut may be screwed down as far as desired, and upon the release of the spring it engages with one of the notches *c*, and prevents the nut from turning on or off, thereby locking it firmly in position.

I am aware that it is not new to attach a spring in a slot extending along the side of a bolt to engage with a nut having a notched interior surface, and I do not claim such, broadly, as my invention; but,

Having thus fully described my invention, what I claim as new, and desire to secure by Letters Patent, is—

As an improvement in nut-locks composed of the internally-grooved nut and the bolt provided with longitudinal groove for the reception of a spring-latch, the extension of the groove across the end of the bolt for the reception of the bent end of the spring, as and for the purposes set forth.

In testimony that I claim the foregoing as my own I have hereto affixed my signature in presence of two witnesses.

JOHN T. SIPE.

Witnesses:
 JOHN FOLEY,
 M. H. EARMAN.